Dec. 9, 1930. C. J. L. DYER 1,784,182
DRAG HARROW
Filed Oct. 5, 1929
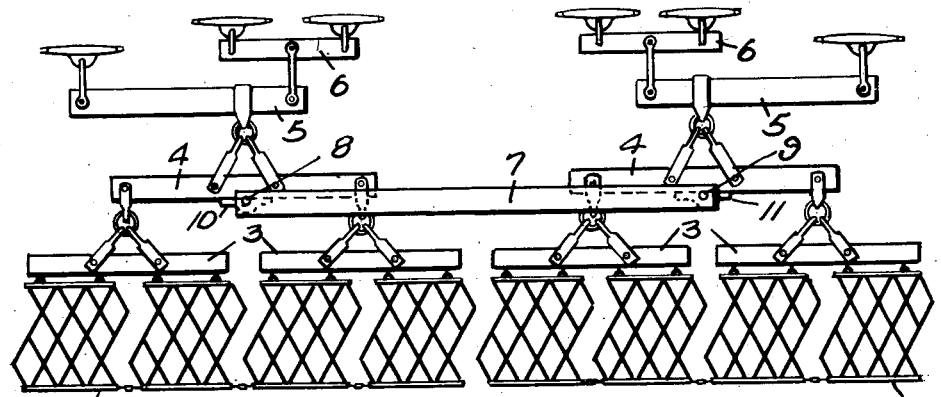
FIG.1.
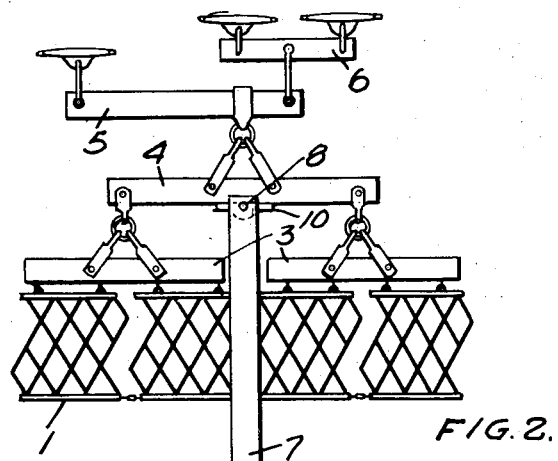
FIG.2.
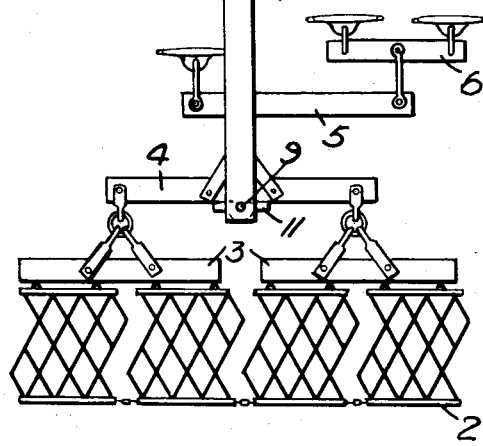
INVENTOR
C.J.L. DYER.
BY
ATTORNEYS Patented Dec. 9, 1930

1,784,182

UNITED STATES PATENT OFFICE

CLARENCE JOHN LAWRENCE DYER, OF KISBEY, SASKATCHEWAN, CANADA

DRAG HARROW

Application filed October 5, 1929. Serial No. 397,614.

My invention relates to improvements in drag harrows, and the object of the invention is to devise means, in a harrow comprising a number of harrow sections arranged in gangs, which will permit the harrow passing through a narrow opening such as a gateway whenever desired, and it consists essentially of the arrangement and construction of parts as hereinafter more particularly explained.

Fig. 1 is a plan view of a harrow showing the sections in the operative position used when harrowing the field.

Fig. 2 is a similar view to Fig. 1 showing the harrow sections disposed in the position they assume when passing through a gateway or other narrow opening.

In the drawings like characters of reference indicate corresponding parts in each figure.

1 and 2 are two gangs of harrow sections, the sections of each gang being arranged in pairs and connected to cross-trees 3. Each pair of cross-trees 3 of each gang is connected to an intermediate cross-tree 4 connected in the usual manner to the cross-trees 5 and 6 provided with the usual whipple-trees which form the ordinary draft gear of the harrow. The cross-trees 4 of each gang are connected together by a connecting bar 7, the bar 7 being provided at its ends with king bolts 8 and 9 journalled in brackets 10 and 11 carried by the intermediate cross-trees 4.

When the harrow is being used for the purpose of harrowing, the horses are connected to each of the draft gears of the harrow sections, thereby pulling comparatively evenly on each gang of harrow sections, no matter whether one gang is in transverse alignment with the other or one in advance of the other.

When it is desired to pass the harrow through a gateway or other narrow opening all it is necessary to do is to unhitch the horses from the draft gear of one of the gangs of harrow sections.

When this is done and the horses pull upon the draft gear of the other gang, the parts naturally assume the position shown in Fig. 2, the bar 7 assuming a position coinciding with the direction of pull of the horses, with one of the gangs assuming a position directly behind the other. By this means the width of the harrow is practically cut in half so that it may pass readily through a gateway or other narrow opening, and at the same time provides a construction which is flexible, permitting the harrow sections at each side of the centre line of the harrow to assume any desired position in relation to the harrow sections on the opposite side of the centre line.

From this description it will be seen that I have devised a very simple construction which will enable a harrow provided with a large number of sections arranged side by side transversely of the harrow and thereby forming a very broad harrow being narrowed in width in a minimum space of time without any adjustment of the harrow itself or any removal of sections so that it may pass readily through a gateway at any time.

Although I have shown and described a harrow provided with eight sections, it will of course be understood that any number of sections may be employed and suitably arranged to operate as above set forth.

What I claim as my invention is:—

A drag harrow, comprising two members each member being provided with a transverse gang of harrow sections, cross-trees to which the sections are connected, intermediate cross-trees to which the aforesaid cross-trees are connected at their ends, and a draft gear connected centrally of each intermediate cross-tree, and a bar member extending between the intermediate cross-trees of each harrow member, a king bolt extending through each end of the bar, and a bracket carried by each intermediate cross-tree and in which the corresponding king bolt is turnably held.

CLARENCE JOHN LAWRENCE DYER.